United States Patent [19]

Suzuki

[11] Patent Number: 5,731,897
[45] Date of Patent: Mar. 24, 1998

[54] ZOOM LENS WITH AN IMAGE STABILIZING FUNCTION

[75] Inventor: Kenzaburo Suzuki, Yokohama, Japan

[73] Assignee: Nikon Corporation, Tokyo, Japan

[21] Appl. No.: 660,003

[22] Filed: Jun. 3, 1996

[30] Foreign Application Priority Data

Jul. 3, 1995 [JP] Japan .................... 7-189864

[51] Int. Cl.$^6$ .................... G02B 27/64; G02B 15/14
[52] U.S. Cl. .................... 359/557; 359/554; 359/687; 359/690
[58] Field of Search .................... 359/554–557, 359/676–677, 686–690, 738, 740; 396/32–55

[56] References Cited

U.S. PATENT DOCUMENTS

| | | | |
|---|---|---|---|
| 4,978,205 | 12/1990 | Sato | 359/557 |
| 5,000,551 | 3/1991 | Shibayama | 359/687 |
| 5,040,881 | 8/1991 | Tsuji | 359/557 |
| 5,227,919 | 7/1993 | Yano | 359/687 |
| 5,249,079 | 9/1993 | Umeda | 359/557 |
| 5,270,857 | 12/1993 | Oizumi et al. | 359/557 |
| 5,311,361 | 5/1994 | Nozawa | 359/687 |
| 5,477,297 | 12/1995 | Suzuki | 356/52 |
| 5,490,014 | 2/1996 | Suzuki | 359/557 |
| 5,585,966 | 12/1996 | Suzuki | 359/557 |
| 5,646,779 | 7/1997 | Sato | 359/554 |
| 5,654,826 | 8/1997 | Suzuki | 359/557 |

FOREIGN PATENT DOCUMENTS

| | | |
|---|---|---|
| A-1-199113 | 8/1989 | Japan . |
| A-5-224160 | 9/1993 | Japan . |

*Primary Examiner*—Thong Nguyen
*Attorney, Agent, or Firm*—Oliff & Berridge, PLC

[57] ABSTRACT

A high performance zoom lens is provided with an image stabilizing function that can maintain a sufficiently long focal length and back focus. The zoom lens with an image stabilizing function includes, in order from an object side to an image side, a first lens group having positive refractive power, a second lens group having negative refractive power, and a terminal lens group having positive refractive power arranged closest to the image side. When zooming from a maximum wide angle state to a maximum telephoto state, the distance between the first lens group and the second lens group increases, and a distance between the second lens group and the terminal lens group changes. The terminal lens group includes, in order from the object side to the image side, at least a first terminal lens group having positive refractive power and a second terminal lens group having negative refractive power, and a displacement mechanism for preventing vibration of the image by rotating the second terminal lens group around a predetermined point on the optical axis of the zoom lens.

29 Claims, 6 Drawing Sheets

ZOOM LENS WITH AN IMAGE STABILIZING FUNCTION

BACKGROUND OF THE INVENTION

1. Field of the Invention

The invention relates to a zoom lens having an image stabilizing function. In particular, it relates to image stabilizing technology of a zoom lens for photo and video usage.

2. Description of Related Art

There are zoom lenses having an image stabilizing function in the prior art, as illustrated in Japanese Laid-Open Patent Publication No. 1-191113. Image stabilizing correction occurs by displacing a total lens group or a part of the lens group in a direction substantially perpendicular to an optical axis along which it moves while zooming. The zoom lens is generally formed of two or more lens groups. "Image stabilizing" is the correcting of fluctuations of the image position caused by shaking of the hands by moving an entire or a part of a lens group in a direction substantially perpendicular to the optical axis of the zoom lens.

With a zoom lens having an image stabilizing function of the prior art as explained above, it was difficult to obtain a sufficiently long back focus for a single lens reflex camera and to obtain a sufficiently long focal length for usage as a telephoto zoom lens.

Japanese Laid-Open Patent Publication No. 5-224160 discloses a zoom lens that contains, in order from the object side, a positive first lens group, a negative second lens group, and a fifth (terminal) lens group that has a negative refractive power and is arranged closest to the image side. When there is zooming from the maximum wide-angle state to the maximum telephoto state, the distance between the first and second lens groups increases and the distance between the second and terminal lens groups changes. In this zoom lens, the terminal (fifth) lens group includes a negative lens group and a positive lens group. Vibration stabilization is attained by moving the negative lens group of this terminal lens group in the direction perpendicular to the optical axis.

SUMMARY OF THE INVENTION

In view of the above-mentioned problems, the invention aims to provide a zoom lens with a high performance image stabilizing function that can provide a sufficiently long focal length and back focus.

Embodiments of the invention provide a zoom lens suitable for photo and video usage, and having an image stabilizing function, the zoom lens including, in order from an object side to an image side, a first lens group G1 having a positive refractive power, a second lens group G2 having a negative refractive power, and a terminal lens group GL having a positive refractive power arranged closest to the image side. A basic structure is adopted so that, during zooming from a maximum wide-angle state to a maximum telephoto state, the distance between the first lens group G1 and the second lens group G2 increases, and the distance between the second lens group G2 and the terminal lens group GL decreases.

The invention further includes a displacement mechanism for stabilizing, or preventing vibration of the image by rotating a lens group GL2 within the terminal lens group GL around a predetermined point on the optical axis. The terminal lens group GL includes, in order from the object side to the image side, at least a lens group GL1, also known as a subgroup, having a positive refractive power and a lens group GL2, also known as a subgroup, having a negative refractive power.

According to a preferred embodiment of the invention, a third lens group G3 having a positive refractive power is arranged between the second lens group G2 and the terminal lens group GL. Alternatively, the terminal lens group GL can be arranged immediately on the image side of the second lens group G2.

In general, in a zoom lens in which the lens groups having positive refractive power are closest to the object side, the first lens group closest to the object side is largest in size. As a result, moving the first lens group relative to the optical axis for stabilizing, or preventing vibration of the image causes the size of the maintaining mechanism and the driving mechanism to be large, which is undesirable.

In a zoom lens according to the invention, it is not advantageous to have the first lens group as the image stabilizing lens. Thus, the invention executes image stabilizing by moving the negative terminal lens group GL2 within the terminal lens group GL relative to the optical axis of the zoom lens, so that when vibration is prevented, satisfactory aberration characteristics are maintained.

The present inventor discovered that the most optimal conditions for stabilizing, or preventing vibration of the image include providing the lens group GL2 having a negative refractive power within the terminal lens group GL, and allowing the negative terminal lens group GL2 to rotate around a predetermined point on the optical axis.

It is further advantageous to perform image stabilizing correction by rotating the image stabilizing lens group GL2 around a point on the optical axis that is separated only a predetermined distance from a surface closest to the image side of the image stabilizing lens group GL2 on the object side. It is also advantageous to provide an aperture diaphragm as close as possible to the image stabilizing lens group GL2 within the terminal lens group GL so that it can prevent vibrations without changing the image quality between the perimeter of the photographic field and the center of the photographic field.

When the image stabilizing lens group GL2 moves relative to the optical axis, the light rays at the perimeter of the photographic field that are a distance from the optical axis sometimes enter the lens group that is positioned at the rear side, as unnecessary light rays, depending on the amount of movement. The unnecessary light emits, for example, ghost pictures and results in unnecessary exposure. Therefore, it is desirable to prepare an aperture diaphragm and a separate flare diaphragm fixed with respect to the optical axis so that entering of the harmful light can be avoided.

BRIEF DESCRIPTION OF THE DRAWINGS

These and other aspects and advantages of the invention will become apparent from the following detailed description of preferred embodiments when taken in conjunction with the accompanying drawings, in which:

FIGS. 2(a)–2(i) are graphs that show spherical aberrations, astigmatisms, distortion aberrations and horizontal aberrations before and after image stabilizing correction at the infinite focus state of the maximum wide angle state of the first embodiment;

FIGS. 3(a)–3(i) are graphs that show spherical aberrations, astigmatisms, distortion aberrations and horizontal aberrations before and after image stabilizing correction at the infinite focus state of the maximum telephoto state of the first embodiment;

FIGS. 5(a)–5(i) are graphs that show spherical aberrations, astigmatisms, distortion aberrations and horizontal aberrations before and after image stabilizing correction at the infinite focus state of the maximum wide-angle state of the second embodiment; and FIGS. 6(a)–6(i) are graphs that show spherical aberrations, astigmatisms, distortion aberrations and horizontal aberrations before and after image stabilizing correction at the infinite focus state of the maximum telephoto state of the second embodiment.

DETAILED DESCRIPTION OF PREFERRED EMBODIMENTS

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

In each embodiment of the invention, a zoom lens with an image stabilizing function includes, in order from the object side to the image side, a first lens group G1 having a positive refractive power, a second lens group G2 having negative refractive power, and a terminal lens group GL having a positive refractive power positioned closest to the image side. During zooming from the maximum wide-angle state to the maximum telephoto state the distance between the first lens group G1 and the second lens group G2 increases and the distance between the second lens group G2 and the terminal lens group GL decreases.

The terminal lens group GL includes, in order from the object side to the image side, at least a first terminal lens group GL1 having a positive refractive power and a second terminal lens group GL2 having a negative refractive power, and a displacement means for stabilizing, or preventing vibration of the image by rotating the image stabilizing, or second terminal lens group GL2 within the terminal lens group GL around a predetermined point on the optical axis.

In the invention, it is preferable that the following conditions are satisfied:

$$0.2 < |fL2|/fL < 8 \quad (1)$$

$$0.2 < |fL2|/fL1 < 20 \quad (2)$$

where, fL1 is a focal length of the first terminal lens group GL1, fL2 is a focal length of the image stabilizing, or second terminal lens group GL2 and fL is a focal length of the terminal lens group GL. Condition formula (1) is an appropriate range for the ratio of the focal length fL2 of the image stabilizing, or second terminal lens group GL2, and the focal length fL of the terminal lens group GL.

When $|fL2|/fL$ is larger than the upper limit value of condition formula (1), the focal length of the image stabilizing lens group GL2 becomes large. Also, the movement amount of the image stabilizing lens group GL2 in a direction perpendicular to the optical axis necessary to correct the fluctuation amount of the predetermined image position becomes too large. In order not to shield light rays when the image stabilizing lens group GL2 moves in the direction perpendicular to the optical axis, the lens diameter of the image stabilizing lens group GL2 must be excessively large. Further, the total length of the zoom lens system becomes too long, which is undesirable.

Conversely, when $|fL2|/fL$ is smaller than the lower limit value of condition formula (1), the focal length of the image stabilizing lens group GL2 becomes too small, and there is an excessive tendency to cause spherical aberrations on the negative side during zooming. Further, the movement amount of the image stabilizing lens group GL2 in the direction perpendicular to the optical axis necessary to correct the fluctuation amount of the predetermined image position becomes too small. As a result, controlling of very fine positioning of the image stabilizing lens group GL2 in the direction perpendicular to the optical axis becomes inconveniently difficult. To obtain even more favorable image formation performance, the upper limit value of condition formula (1) may be changed to 5.0, and the lower limit value may be changed to 1.5.

Condition formula (2) is an appropriate range for the ratio of the focal length fL2 of the image stabilizing lens group GL2 and the focal length fL1 of the first terminal lens group GL1 that is closest to the object side within the terminal lens group GL. Condition formula (2) is important as a condition for attaining favorable imaging performance that includes an image stabilizing function in the terminal lens group GL. When $|fL2|/fL1$ is greater than the upper limit value of condition formula (2), it is easy for spherical aberrations to become excessive on the negative side. Further, the total length of the zoom lens system becomes too long, preventing the system from be compact. Also, the Petzval sum becomes excessive on the positive side and the curvature of the image and astigmatic difference becomes too large. It becomes impossible to obtain a favorable imaging performance.

Conversely, when $|fL2|/fL1$ is smaller than the lower limit value of the condition formula (2), it becomes difficult to secure a back focus of sufficient length. Further, the spherical aberrations become too large on the negative side, because outward coma aberrations to the light rays of the upper side of the main light rays are easily produced. To obtain an even more favorable imaging performance, the upper limit value of condition formula (2) may be changed to 8 and the lower limit value may be changed to 1.5.

To obtain an even more favorable imaging performance, the following condition formulae may be satisfied:

$$DW < 0.2 \quad (3)$$

$$-3.0 < RL/|fL2| < 0 \quad (4)$$

$$L/fL < 0.3 \quad (5)$$

where, DW is a size of a largest rotation (rad) angle of the image stabilizing lens group GL2 during image stabilizing, RL is a curvature radius of a surface closest to the image side of the image stabilizing tens group GL2, and L is an on-axis thickness of the image stabilizing lens group GL2. The on-axis thickness L of the image stabilizing lens group GL2 is a distance along the optical axis between the surface closest to the object side of the image stabilizing lens group GL2 and the surface closest to the image side.

Condition Formula (3) is an appropriate range for a size of the largest rotation angle (rad) of the image stabilizing lens group GL2 during image stabilizing. When DW is greater than the upper limit value of condition formula (3), the size of the largest rotation angle of the image stabilizing lens group GL2 becomes too large, and as a result the aberration fluctuation amount during image stabilizing becomes too large. In particular, at the perimeter position on the image plane, the difference in the direction of the optical axis of the most favorable image surface in the meridional direction and the most favorable image surface in the sagittal direction is widened, which is undesirable. In addition, it is undesirable to have the driving mechanism become complex.

Condition formula (4) is an appropriate range for the ratio of a curvature radius of a surface closest to the image side of the image stabilizing lens group GL2 and a focal length of the image stabilizing lens group GL2. If RL/|fL2| is outside of the range established by the upper limit value and the lower limit value of condition formula (4), the fluctuations of the spherical aberrations and the fluctuations of the image bowing during zooming become excessively large. Even during image stabilizing, the fluctuations of the spherical aberrations and the fluctuations of the coma aberrations become excessively large and correction of the aberrations becomes difficult. To obtain an even more favorable imaging performance, the upper limit value of condition formula (4) may be changed to −0.3 and the lower limit value may be changed to −0.8.

Condition formula (5) establishes an appropriate range for the ratio of an on-axis thickness of the image stabilizing lens group GL2 and a focal length of the terminal lens group GL. When L/fL is greater than the upper limit value of condition formula (5), the on-axis thickness of image stabilizing lens group GL2 becomes too large and the image stabilizing lens group GL2 becomes too large. As a result, not only does the total length of the zoom lens system become too long, but also the image stabilizing driving mechanism becomes inconveniently complex.

In forming the image stabilizing lens group GL2, the following formulae may be satisfied:

$$0 < D/fL < 10.0 \tag{6}$$

$$40 < n- \tag{7}$$

where, D is a distance along the optical axis from a surface closest to the image side of the image stabilizing group GL2 to a center of rotation when there is image stabilizing towards the object side, and n− is the Abbe number of the negative lens component closest to the object side within the image stabilizing lens group GL2.

The preference points on the optical axis are separated a predetermined distance from a surface closest to the image side of the image stabilizing lens group GL2 on the object side and are the center of rotation during image stabilizing, as explained above, but condition formula (6) regulates an appropriate range of the ratio of the predetermined distance and the focal length of the terminal lens group GL. When D/fL is outside of the range of condition formula (6), the fluctuations of coma aberrations during image stabilizing become too large, which is undesirable. In particular, at the perimeter of the image surface, the difference in the optical axis direction of the most favorable image surface in the meridional direction and the most favorable image surface in the sagittal direction becomes widened, which is undesirable.

To obtain an even more favorable imaging performance, the upper limit value of condition formula (6) may be changed to 2.0. Also, when n− is beyond the limit value of condition formula (7), on-axis chromatic aberrations become excessive and favorable imaging performance is not achieved.

To obtain an even more favorable imaging performance, the following condition formula may be satisfied:

$$-5.5 < q+ < 8.0 \tag{8}$$

where, q+ is a shape factor of a positive lens component closest to the object side within the image stabilizing lens group.

Furthermore, shape factor q of the lens component is shown in the following formula:

$$q=(R2+R1)/(R2-R1) \tag{a}$$

where, R1 is a radius of curvature of a surface on the object side of the lens component and R2 is a radius of curvature of a surface on the image side of the lens component. When q+ is greater than the upper limit value of condition formula (8), not only do spherical aberrations become very large in the negative direction, but the inward coma aberrations also become too large. Conversely, if q+ is smaller than the lower value of condition formula (8), not only do the spherical aberrations become very large in the negative direction, but also an astigmatism becomes very large.

To obtain a favorable imaging performance, the following condition formulae may be satisfied:

$$0.15 < |f2|/f1 < 0.45 \tag{9}$$

$$0.8 < f3/f1 < 1.7 \tag{10}$$

where, f1 is a focal length of the first lens group G1, f2 is a focal length of the second lens group G2 and f3 is a focal length of the third lens group G3.

When |f2|/f1 is greater than the upper limit value of condition formula (9), the spherical aberrations of the maximum telephoto state become very large in the negative direction and the fluctuations of the coma aberrations become excessively large. On the other hand, when |f2|/f1 is smaller than the lower limit value of condition formula (9), the astigmatic difference of the maximum wide-angle state becomes excessively large, and the distortion aberrations at the maximum wide-angle state and maximum telephoto state move largely in the negative direction. Also, the Petzval sum easily fluctuates in the negative direction.

Condition formula (10) is the condition formula for the structure in which the third lens group G3 is provided between the second lens group G2 and the terminal lens group GL. When f3/f1 is greater than the upper limit value of condition formula (10), spherical aberrations become very large in the negative direction and the fluctuations of coma aberrations become excessively large. Also, the Petzval sum easily fluctuates in the negative direction. Conversely, when f3/f1 is smaller than the lower limit value of condition formula (10), the total length of the zoom lens system easily become too long and the distortion aberrations in the maximum telephoto state easily become excessive in the positive direction.

In forming a zoom lens of three groups including the first lens group G1, the second lens group G2 and the terminal lens group GL, it is advantageous to execute zooming by moving the first lens group G1 and the terminal lens group GL. With this structure, in particular, not only is it possible to realize a compact optical system at the maximum wide-angle state, favorable imaging performance also can be obtained.

Also, in forming a zoom lens of four groups including the first lens group G1, the second lens group G2, the third lens group G3 and the terminal lens group GL, it is advantageous to fix the second lens group G2 during zooming. With this structure, it is possible to simplify the driving mechanism for zooming.

In the structure in which the terminal lens group GL has a third terminal lens group GL3 closest to the image side, the third terminal lens group GL3 may have a positive refractive power or may have a negative refractive power. However, where it is desirable to shorten the total length of the zoom lens system or to draw the exit pupil nearer to the image side, it is effective for the third lens group GL3 to have a positive refractive power. On the other hand, in such cases where it is desirable to balance the distortion aberrations at the negative side or where the exit pupil is separated from the image surface, it is effective for the third terminal lens group GL3 to have a positive refractive power.

Also, the focal length fL3 of the third terminal lens group GL3 may satisfy the following condition formula:

$$0.5 < |fL3|/fL < 8 \qquad (11)$$

Further, the third terminal lens group GL3 may have a negative refractive power. In this case, the third terminal lens group GL3 has at least one positive lens component and at least one negative lens component.

Also, by providing a spherical surface for at least one lens surface among the lens surfaces forming the optical system, a more favorable imaging performance can be obtained. Furthermore, by using a refraction index distribution glass as at least one of the lens among the lens that form the optical system, a more favorable imaging performance can be obtained.

Figure 1:
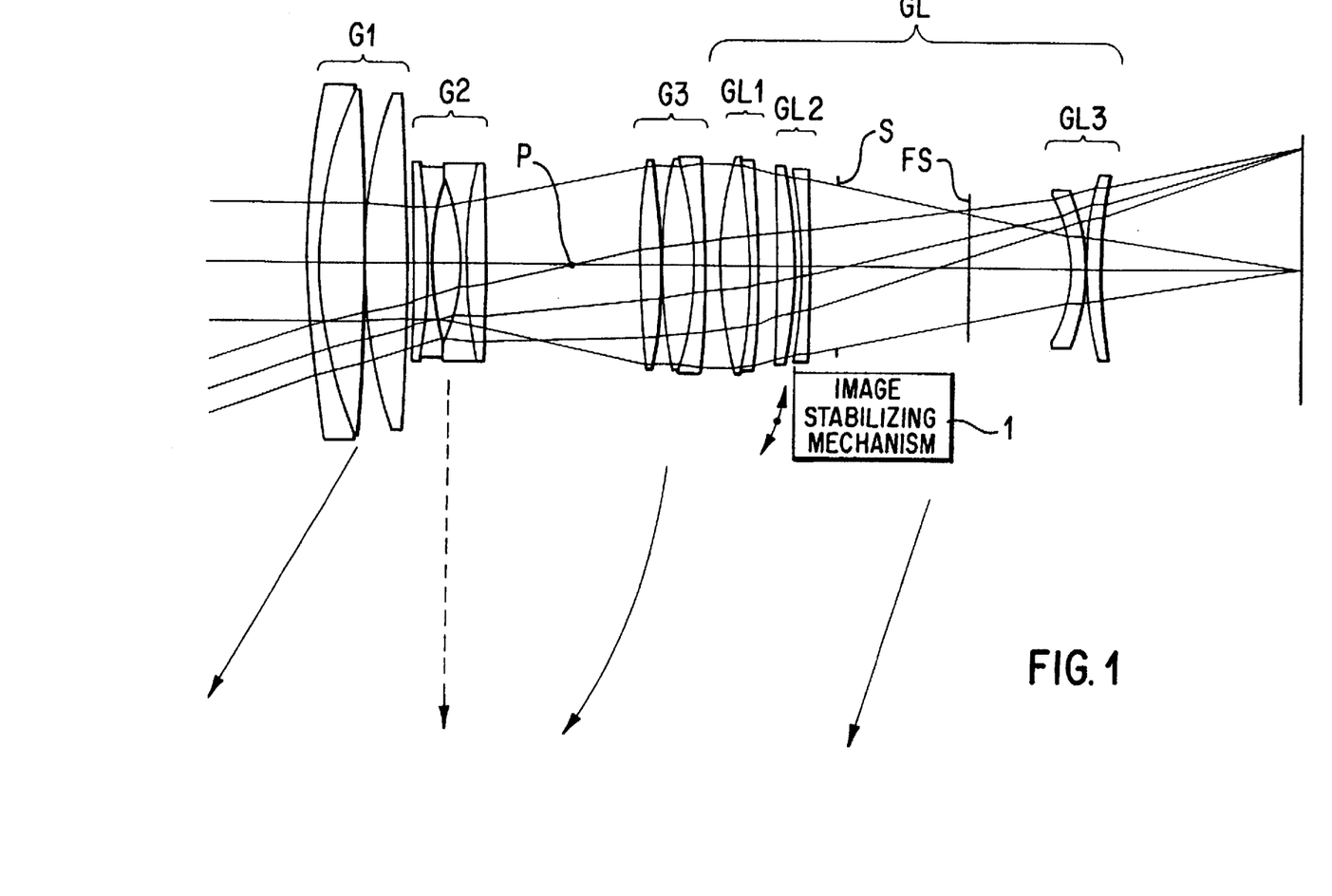
FIG. 1 is a schematic side view of the structure of a zoom lens of the first embodiment of the invention.
Figures 2A, 2B, 2C, 2D, 2E, 2F, 2G, 2H, 2I:
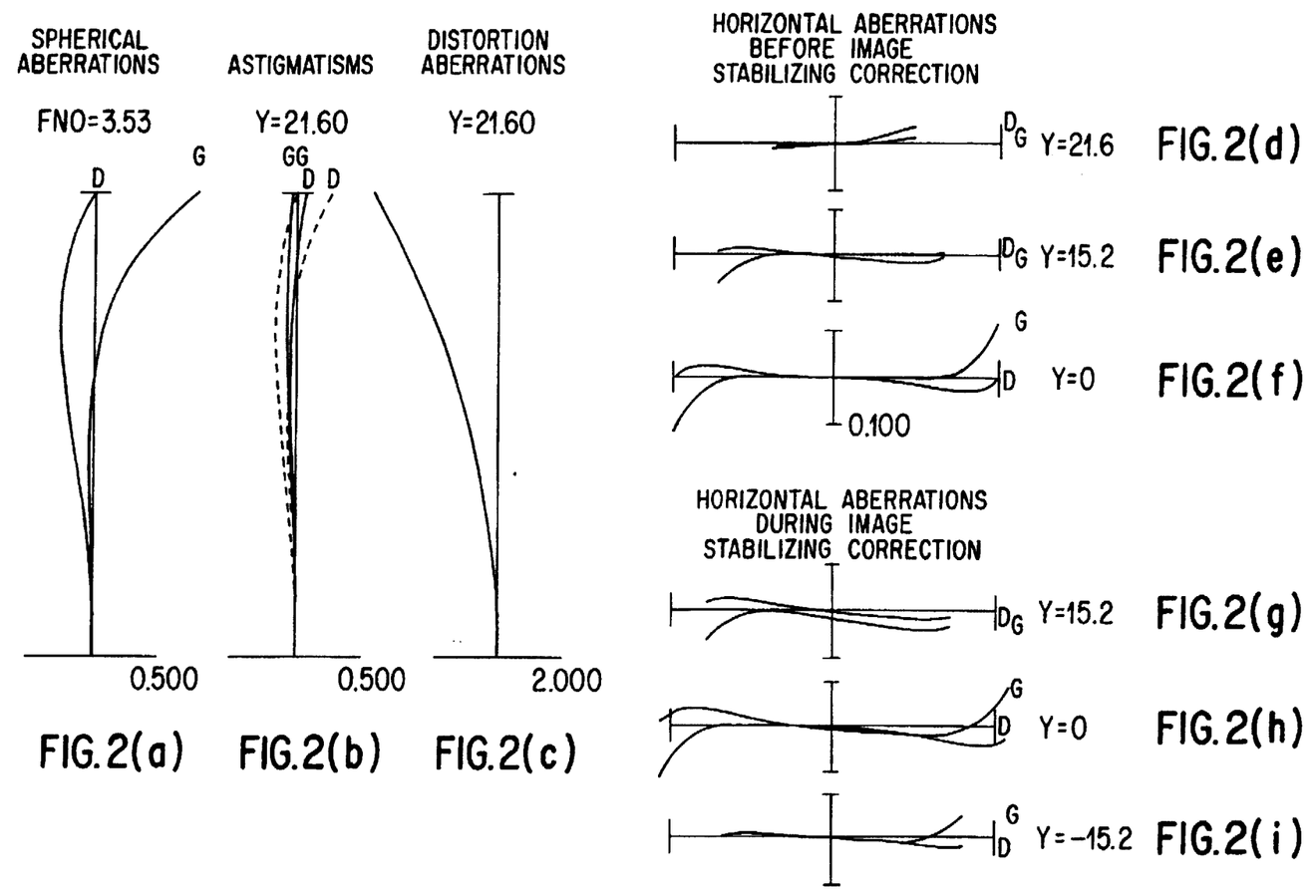
Figure 3A:
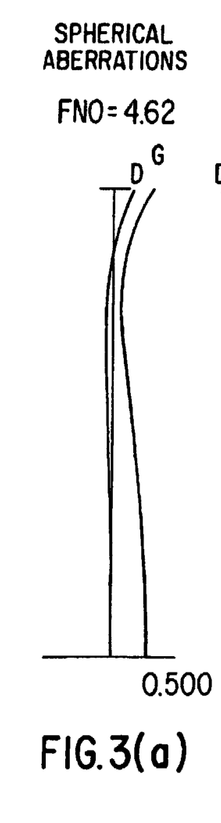
Figure 3B:
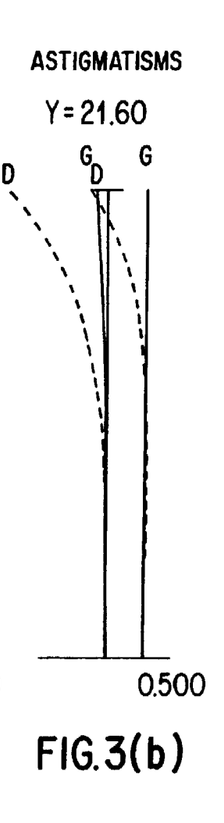
Figure 3C:
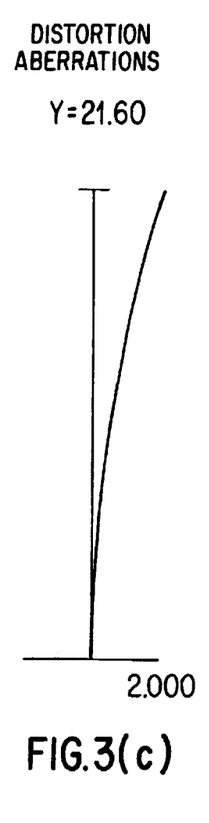
Figure 3D:
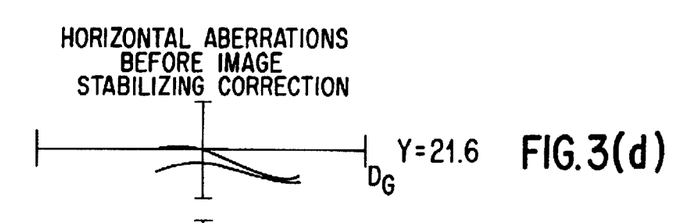
Figure 3E:
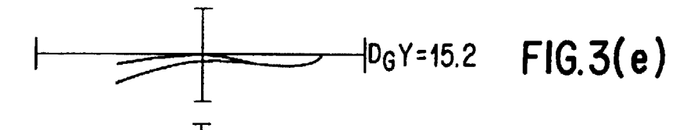
Figure 3F:
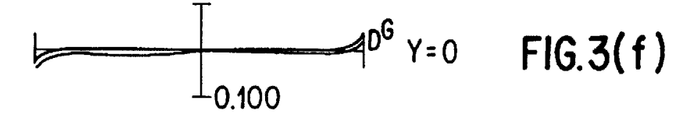
Figure 3G:
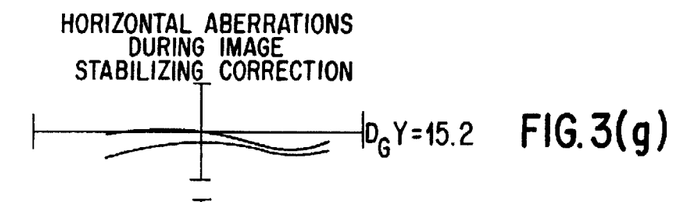
Figures 3H, 3I:
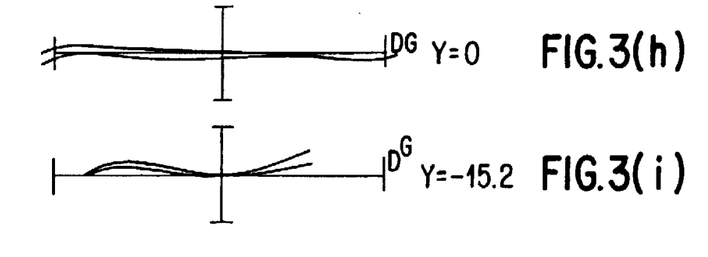

FIG. 1 is a schematic side view of the structure of the zoom lens of the first embodiment of the invention. The zoom lens of FIG. 1 includes, in order from the object side to the image side, a first lens group G1 having positive refractive power, a second lens group G2 having negative refractive power, a third lens group G3 having positive refractive power and a terminal lens group GL having positive refractive power.

The first lens group G1 includes, in order from the object side to the image side: a cemented positive lens including a negative meniscus lens with a convex surface facing the object side and a biconvex lens; and a biconvex lens. The second lens group G2 includes, in order from the object side to the image side: a cemented negative lens including a positive meniscus lens with a concave surface facing the object side and a biconcave lens; and a cemented negative lens including a biconcave lens and a biconvex lens.

The third lens group G3 includes, in order from the object side to the image side: a biconvex lens; and a cemented positive lens including a biconvex lens and a negative meniscus lens with a concave surface facing the object side.

The terminal lens group GL includes, in order from the object side to the image side: a first terminal lens group GL1 comprising a cemented positive lens including a biconvex lens and a negative meniscus lens with a concave surface facing the object side; a second terminal lens group GL2 comprising a positive meniscus lens with a concave surface facing the object side, and a negative meniscus lens with a concave surface facing the object side; and a third terminal lens group GL3 comprising a negative meniscus lens with a concave surface facing the object side and a positive meniscus lens with a convex surface facing the object side.

Between the second terminal lens group GL2 and the third terminal lens group GL3 within the terminal lens group GL, an aperture diaphragm S and a fixed flare diaphragm FS are provided. FIG. 1 shows the positional relationship of each lens group at the maximum wide-angle state. During zooming to the maximum telephoto state, the first lens group G1, the third lens group G3, and the terminal lens group GL move on the optical axis along a zoom path to the positions shown by the arrow signs in FIG. 1. However, the second lens group G2 is fixed so as to be prevented from moving in the direction along the optical axis during zooming. The image stabilizing mechanism 1 (the displacement means) moves the image stabilizing, or second terminal lens group GL2, within the terminal lens group GL rotatably around point P to correct the fluctuations of the image position caused by vibrations of the zoom lens. The first embodiment is the application of the invention to a telephoto lens.

In the following table, the values of the dimensions of the first embodiment of the invention are presented, where f is the focal length, $F_{NO}$ is the F number, $2\omega$ is field angle, and Bf is the back focus. The leftmost number is the order of each lens surface from the object side, while r is the curvature radius of each lens surface, d is the distance of each lens surface spacing, n(D) is the refraction index relative to the d-line ($\lambda$=587.6 nm), n(G) is the refraction index relative to the g-line ($\lambda$=435.8 nm), and $\nu$ is the Abbe number.

TABLE 1 f = 70.0 ~ 243
$F_{NO}$ = 3.53 ~ 4.62
$2\omega$ = 35.6° ~ 9.94°

|  | r | d | v | n(D) | N(G) |
|---|---|---|---|---|---|
| 1 | 183.6270 | 1.7000 | 35.19 | 1.749501 | 1.776948 |
| 2 | 69.3402 | 8.5000 | 70.24 | 1.487490 | 1.495960 |
| 3 | −613.5196 | 0.2000 |  |  |  |
| 4 | 84.4130 | 8.000 | 70.24 | 1.487490 | 1.495960 |
| 5 | −360.3271 | (d5 = variable) |  |  |  |
| 6 | −236.6212 | 2.3000 | 30.04 | 1.698950 | 1.729421 |
| 7 | −91.7589 | 0.90000 | 45.37 | 1.796681 | 1.818801 |
| 8 | 45.4981 | 5.70000 |  |  |  |
| 9 | −35.4354 | 0.90000 | 61.09 | 1.589130 | 1.601033 |
| 10 | 69.9837 | 4.0000 | 23.20 | 1.908370 | 1.960500 |
| 11 | −259.3143 | (d11 = variable) |  |  |  |
| 12 | 188.5320 | 3.8000 | 48.97 | 1.531721 | 1.545400 |
| 13 | −97.0520 | 0.2000 |  |  |  |
| 14 | 85.9590 | 6.8000 | 65.77 | 1.464500 | 1.473154 |
| 15 | −46.9977 | 1.5000 | 28.56 | 1.795040 | 1.831518 |
| 16 | −165.4817 | (d16 = variable) |  |  |  |
| 17 | 63.8280 | 6.5000 | 60.14 | 1.620409 | 1.633173 |
| 18 | −58.0170 | 1.000 | 27.83 | 1.699110 | 1.732332 |
| 19 | −157.4591 | 3.9000 |  |  |  |
| 20 | −258.2621 | 3.2000 | 35.51 | 1.595071 | 1.616844 |
| 21 | −79.1374 | 1.4000 |  |  |  |
| 22 | −75.9410 | 1.6000 | 49.45 | 1.772789 | 1.792324 |
| 23 | −268.2117 | 5.000 |  |  |  |
| 24 | ∞ | 25.0000 | (aperture diaphragm S) | | |
| 25 | ∞ | 20.0000 | (fixed flare diaphragm FS) | | |
| 26 | −23.1618 | 2.3000 | 45.00 | 1.744000 | 1.764871 |
| 27 | −33.7082 | 0.1000 |  |  |  |
| 28 | 60.8316 | 2.8000 | 33.75 | 1.648311 | 1.673232 |
| 29 | 94.4248 | (Bf) |  |  |  |

| Variable Distance in Displacment: | | |
|---|---|---|
| f | 69.99986 | 242.99983 |
| d5 | 1.27175 | 49.96125 |
| d11 | 28.92918 | 0.79038 |
| d16 | 3.20306 | 6.99716 |
| Bf | 38.3816 | 62.7266 |

| Values Corresponding to Conditions: | | |
|---|---|---|
| fL | = | 110.000 |
| fL1 | = | 78.981 |
| fL2 | = | −496.973 |
| fL3 | = | −194.703 |
| RL | = | −268.2117 |
| L | = | 6.200 |
| D | = | 40.000 |
| f1 | = | 122.800 |
| f2 | = | −32.400 |

TABLE 1-continued $f = 70.0 \sim 243$
$F_{NO} = 3.53 \sim 4.62$
$2\omega = 35.6° \sim 9.94°$

| | f3 | = | 86.800 |
|---|---|---|---|
| (1) | |fL2|/fL | = | 4.518 |
| (2) | |fL2|/fL1 | = | 6.292 |
| (3) | ΔW | = | 0.0873 |
| (4) | RL/|fL2| | = | −0.540 |
| (5) | L/fL | = | 0.0564 |
| (6) | D/fL | = | 0.364 |
| (7) | ν− | = | 49.45 |
| (8) | q+ | = | −1.884 |
| (9) | f2/f1 | = | 0.264 |
| (10) | f3/f1 | = | 0.707 |

| Image Stabilizing Lens Group GL2 | Maximum Wide-angle State | Maximum Telephoto State |
|---|---|---|
| Size ΔW of Largest Rotating Angle: | 0.0873 | 0.0873 |
| Movement Amount ΔY of Corresponding Image: | −0.656 | −0.866 | where, the negative symbols represent the reverse of the movement direction of the image stabilizing lens and the movement direction of the image.

FIGS. 2(a)–2(i) and 3(a)–3(i) are graphs that show spherical aberrations, astigmatisms, distortion aberrations and horizontal aberrations before and after image stabilizing correction at the infinite focus state of the maximum wide-angle state and at the infinite focus state of the maximum telephoto state, respectively. In the graphs, $F_{NO}$ denotes F number, Y denotes the image height, D denotes the d-line (λ=587.6 nm) and G denotes the g-line (λ=435.8 nm), respectively. Further, in the graphs showing astigmatisms, the solid lines represent a sagittal image plane, and the broken lines represent a meridional image plane. Each graph clearly indicates that the various aberrations are corrected favorably and vibration is prevented.

Figure 4:
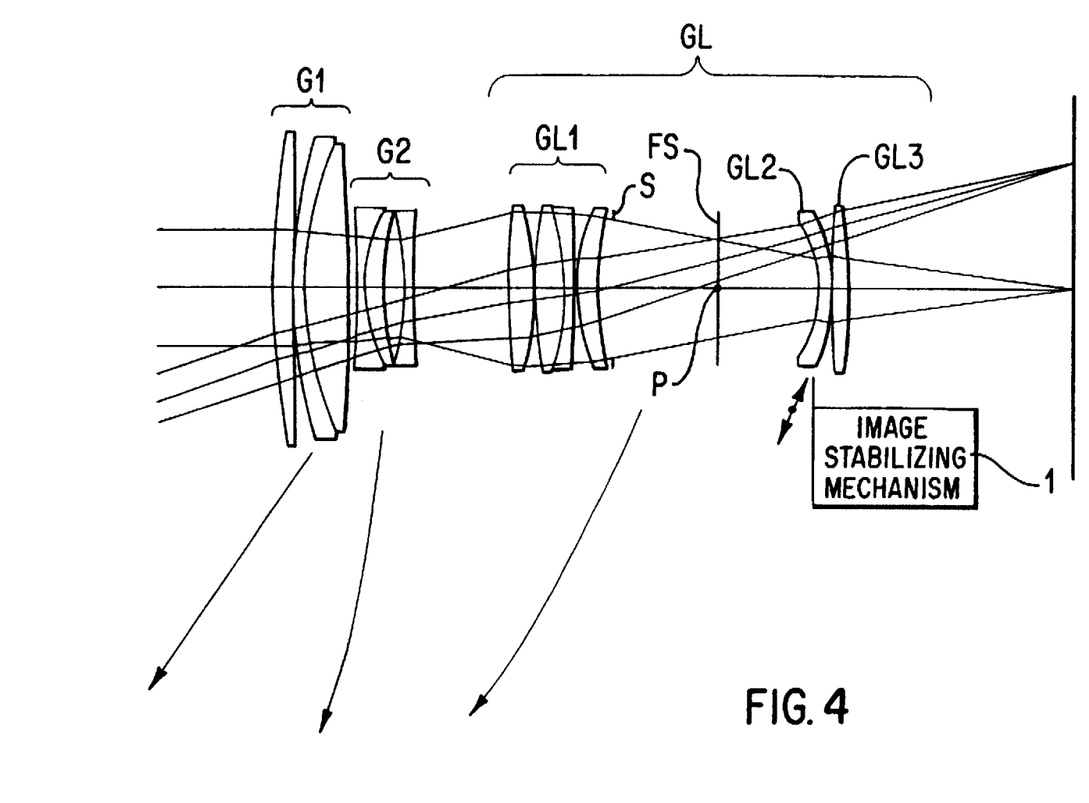
FIG. 4 is a schematic side view of the structure of a zoom lens of the second embodiment of the invention.
Figure 5A:
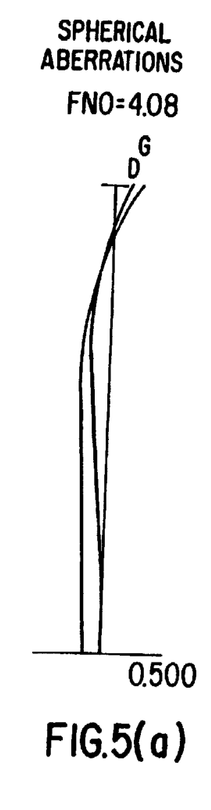
Figure 5B:
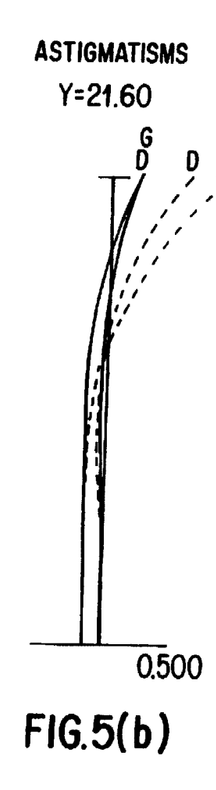
Figure 5C:
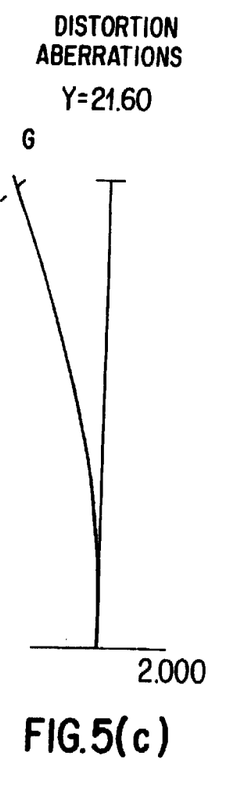
Figure 5D:
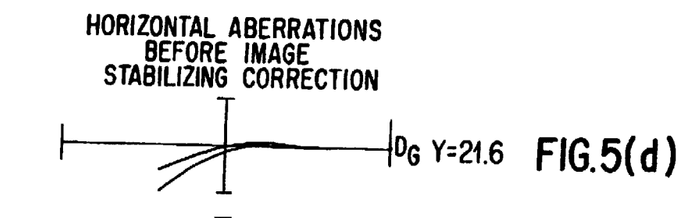
Figure 5E:
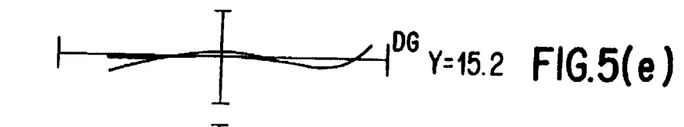
Figure 5F:
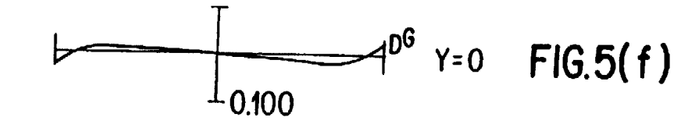
Figures 5G, 5H:
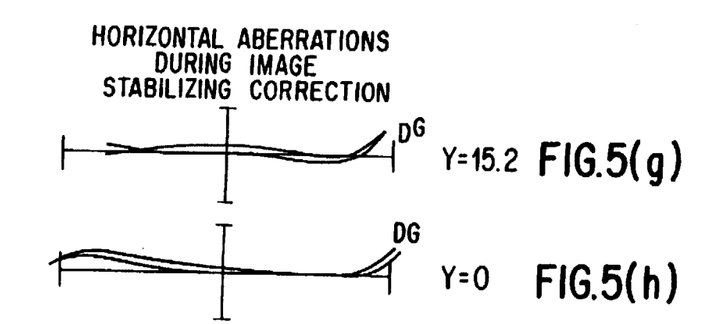
Figure 5I:
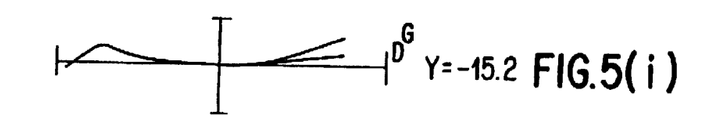
Figure 6A:
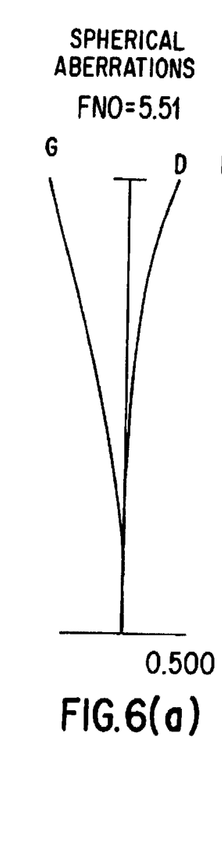
Figure 6B:
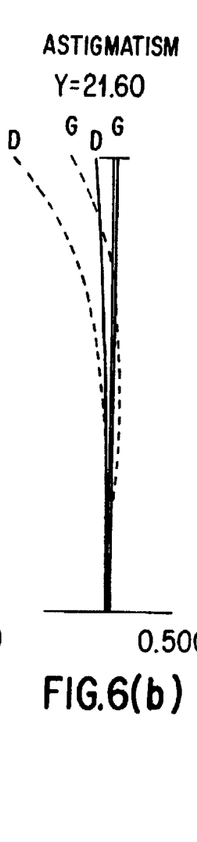
Figure 6C:
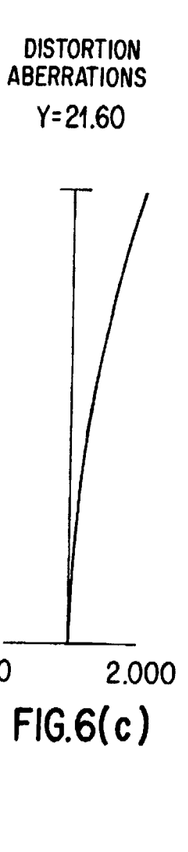
Figures 6D, 6E:
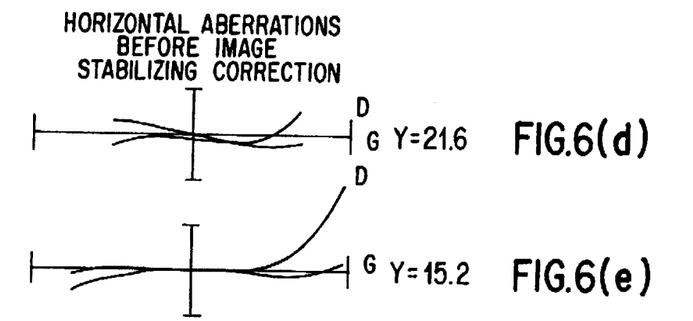
Figure 6F:
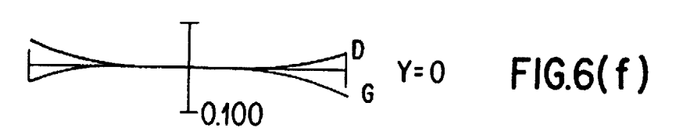
Figure 6G:
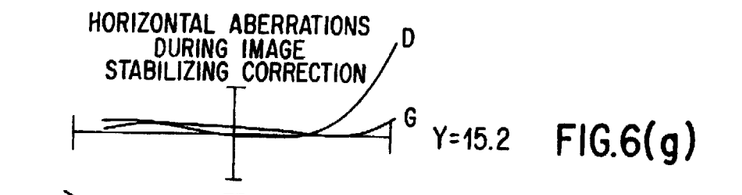
Figures 6H, 6I:
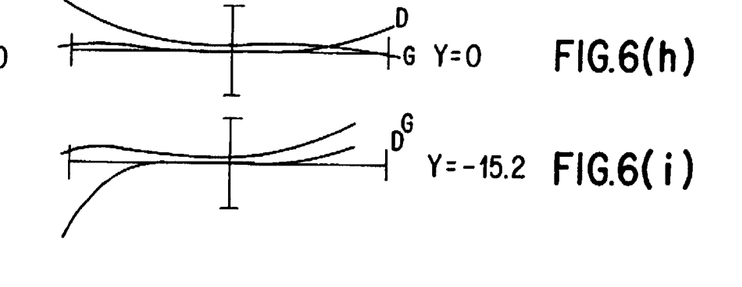

FIG. 4 is a schematic side view of the structure of a zoom lens of the second embodiment of the invention. The zoom lens of FIG. 4 includes, in order from the object side to the image side, a first lens group G1 having positive refractive power, a second lens group G2 having negative refractive power, and a terminal lens group GL having positive refractive power.

The first lens group G1 includes, in order from the object side to the image side: a positive meniscus lens with a convex surface facing the object side; and a cemented positive lens including a negative meniscus lens with the convex surface facing the object side and a biconvex lens. The second lens group G2 includes, in order from the object side to the image side: a biconcave lens, and a cemented negative lens including a biconvex lens and a positive meniscus lens with the convex surface facing the object side. The terminal lens group GL includes, in order from the object side to the image side: a first terminal lens group GL1 comprising a biconvex lens and a cemented positive lens including a biconvex lens and a negative meniscus lens with a concave surface that faces the object side, and a positive meniscus lens with a convex surface that faces the object side; a second terminal lens group GL2 comprising a negative meniscus lens with a concave surface facing the object side; and a third terminal lens group GL3 comprising a biconvex lens.

Between the first terminal lens group GL1 and the second terminal lens group GL2 within the terminal lens group GL, the aperture diaphragm S and the fixed flare diaphragm FS are provided. FIG. 4 shows the positional relationship of each lens group at the maximum wide-angle state. During zooming to the maximum telephoto state, each lens group moves on the optical axis along the zoom path to the position shown by the arrows in FIG. 4. The image stabilizing mechanism 1 (the displacement means) moves the second terminal lens group GL2 rotatingly around point P to correct the fluctuations of the image position caused by vibrations of the zoom lens. The second embodiment is a zoom lens formed of positive-negative-positive groups and is an application of the invention to the telephoto region of the photographic lens.

In the following table, the values of the dimensions of the second embodiment of the invention are presented, where f is the focal length, $F_{NO}$ is the F number, 2ω is the field angle, and Bf is the back focus. The leftmost number is the order of each lens surface from the object side, while r is the curvature radius of each lens surface, d is the distance of each lens surface spacing, n(D) is the refraction index relative to the d-line (λ=587.6 nm), n(G) is the refraction index relative to the g-line (λ=435.8 nm), and ν is Abbe's number.

TABLE 2

$f = 71.5 \sim 205$
$F_{NO} = 4.08 \sim 5.51$
$2\omega = 34.58° \sim 11.76°$

| | r | d | ν | n(D) | n(G) |
|---|---|---|---|---|---|
| 1 | 124.7454 | 3.7000 | 63.81 | 1.514320 | 1.526690 |
| 2 | 4325.3649 | 0.1000 | | | |
| 3 | 87.6101 | 2.000 | 25.21 | 1.795520 | 1.846340 |
| 4 | 52.4530 | 1.7000 | 63.81 | 1.514320 | 1.526690 |
| 5 | −414.7178 | (d5 = variable) | | | |
| 6 | −150.7512 | 1.2000 | 58.24 | 1.648210 | 1.665380 |
| 7 | 20.5430 | 3.4000 | 22.72 | 1.850050 | 1.910650 |
| 8 | 36.3736 | 4.2000 | | | |
| 9 | −35.4844 | 1.2000 | 58.24 | 1.648210 | 1.665380 |
| 10 | 2268.3069 | (d10 = variable) | | | |
| 11 | 102.6370 | 4.5000 | 56.16 | 1.498670 | 1.512390 |
| 12 | −38.2426 | 0.2000 | | | |
| 13 | 64.3912 | 5.3000 | 69.77 | 1.516320 | 1.527660 |
| 14 | −31.6040 | 1.4000 | 27.35 | 1.747310 | 1.791120 |
| 15 | −370.5655 | 0.8000 | | | |
| 16 | 29.2359 | 3.6000 | 53.67 | 1.709000 | 1.729410 |
| 17 | 44.1264 | 2.8000 | | | |
| 18 | ∞ | 19.4000 | (aperture diaphragm S) | | |
| 19 | ∞ | 18.0000 | (fixed flare diaphragm FS) | | |
| 20 | −18.1375 | 2.1000 | 46.46 | 1.761920 | 1.787450 |
| 21 | −28.8764 | 0.2000 | | | |
| 22 | −4032.0107 | 2.8000 | 28.05 | 1.720820 | 1.762060 |
| 23 | −71.7463 | (Bf) | | | |

| Variable Distance in Zooming: | | |
|---|---|---|
| f | 71.49982 | 204.98600 |
| d5 | 1.75619 | 38.56249 |
| d10 | 17.04370 | 1.12400 |
| Bf | 40.9624 | 68.7956 |

| Values Corresponding to Conditions: | | |
|---|---|---|
| fL | = | 34.505 |
| fL1 | = | 34.152 |
| fL2 | = | −69.923 |
| fL3 | = | 101.308 |
| RL | = | −28.876 |
| L | = | 2.100 |
| D | = | 18.000 |
| f1 | = | 122.065 |

TABLE 2-continued f = 71.5 ~ 205
$F_{NO}$ = 4.08 ~ 5.51
2ω = 34.58° ~ 11.76°

| | | | |
|---|---|---|---|
| | f2 | = | −26.700 |
| (1) | lfL2l/fL | = | 2.026 |
| (2) | lfL2l/fL1 | = | 2.047 |
| (3) | ΔW | = | 0.0297 |
| (4) | RL/lfL2l | = | −0.413 |
| (5) | L/fL | = | 0.0609 |
| (6) | D/fL | = | 0.522 |
| (7) | ν− | = | 46.46 |
| (8) | q+ | = | 4.378 |
| (9) | lf2l/f1 | = | 0.219 |

| Image Stabilizing Lens Group GL2 | Maximum Wide-angle State | Maximum Telephoto State |
|---|---|---|
| Size ΔW of Largest Rotating Angle: | 0.0297 | 0.0297 |
| Movement Amount ΔY of Corresponding Image: | −0.282 | −0.465 | where the negative symbols represent the reverse of the movement direction of the image stabilizing lens and the movement direction of the image.

FIGS. 5(a)–5(i) and 6(a)–6(i) are graphs that show spherical aberrations, astigmatisms, distortion aberrations and horizontal aberrations before and after image stabilizing correction at the infinite focus state of the maximum wide-angle state and at the infinite focus state of the maximum telephoto state, respectively. In the graphs, $F_{NO}$ denotes F number, Y denotes the image height, D denotes the d-line (λ=587.6 nm) and G denotes the g-line (λ=435.8 nm), respectively. In the aberration graphs showing astigmatisms, the solid lines represent a sagittal image plane, and the broken lines represent a meridional image plane.

Each graph clearly indicates that the various aberrations are corrected favorably and vibration is prevented. In particular, in the second embodiment, since rotating center point P and fixed flare diaphragm FS coincide on the optical axis, the operation of the fixed flare diaphragm FS is effective.

As explained above, the invention provides a high performance zoom lens in which sufficiently long back focus and focal length can be attained, and excellent image stabilizing for photo and video usage can be realized.

In all embodiments, an advantage of making the terminal lens group GL from a positive lens group GL1 and a negative lens group GL2 that is the image stabilizing lens group is that the image stabilizing lens group can be made compact. This is because the light coming towards the image stabilizing lens group (GL2) is gathered by the positive lens groups that proceed the image stabilizing lens groups.

There also are advantages in rotating the image stabilizing lens group about a point on the optical axis instead of moving the image stabilizing lens group perpendicular to that axis. As the image stabilizing lens group is rotated, it is sloped (tilted slightly) as compared to stabilizing lens groups that are moved perpendicular to the optical axis, and therefore remains in a plane that is perpendicular to the optical axis. This slight tilting has an advantage in being able to compensate to a certain extent for the worsening of aberrations when the image stabilizing lens group separates from the optical axis. Therefore, the rotation method has an advantage over the perpendicular shift method, with respect to the prevention of the worsening of aberrations during image stabilizing.

Advantages of keeping the refractive power of the terminal lens group GL within specified limits are that: distortion, especially distortion in the maximum telephoto state, can be kept low; spherical aberrations can be satisfactorily corrected; and it is easy to correct the Petzval sum to an optimal range (slightly positive of 0).

Additionally, fluctuations of spherical aberrations can be minimized during image stabilization, particularly when the zoom lens is the positive-negative-positive-positive type, with the positive lens group on the object side, followed by the negative lens group, and with a negative lens group being used as the image stabilizing lens group.

While the invention has been described in conjunction with preferred embodiments thereof, it is evident that many alternatives, modifications and variations may be apparent to those skilled in the art. Accordingly, it is intended to embrace all alternatives, modifications and variations that may fall within the spirit and broad scope of the appended claims.

What is claimed is:

1. A zoom lens with an image stabilizing function, comprising, in order from an object side to an image side:

a first lens group having positive refractive power;

a second lens group having negative refractive power;

a terminal lens group having positive refractive power arranged closest to the image side, the terminal lens group including at least, in order from the object side to the image side, a first terminal lens subgroup having positive refractive power and a second terminal lens subgroup having negative refractive power; and a displacement device coupled to the second terminal lens subgroup and effecting image stabilizing by rotating the second terminal lens subgroup around a predetermined point on an optical axis of the zoom lens, wherein during zooming from a maximum wide-angle state to a maximum telephoto state, a distance between the first lens group and the second lens group increases, and a distance between the second lens group and the terminal lens group changes.

2. The zoom lens with an image stabilizing function of claim 1, wherein a third lens group having positive refractive power is arranged between the second lens group and the terminal lens group.

3. The zoom lens with an image stabilizing function of claim 2, wherein the following conditions are satisfied:

$$0.2 < \text{lfL2l/fL} < 8$$

$$0.2 < \text{lfL2l/fL1} < 20$$

where, fL1 is a focal length of the first terminal lens group, fL2 is a focal length of the second terminal lens subgroup, and fL is a focal length of the terminal lens subgroup.

4. The zoom lens with an image stabilizing function of claim 3, wherein the following conditions are satisfied:

$$0.15 < \text{lf2l/f1} < 0.45$$

$$0.8 < f3/f1 < 1.7$$

where f3 is a focal length of the third lens group, f2 is a focal length of the second lens group, and f1 is a focal length of the first lens group.

5. A zoom lens with an image stabilizing function of claim 2, wherein the following conditions are satisfied:

$$\Delta W < 0.2$$

$-3.0 < RL/|fL2| < 0$ $L/fL < 0.3$ where, fL2 is a focal length of the second terminal lens group, fL is a focal length of the terminal lens subgroup, ΔW is a size of a largest rotation angle (rad) of the second terminal lens subgroup during image stabilizing, RL is a curvature radius of surfaces closest to the image side of the second terminal lens subgroup, and L is an on-axis thickness of the second terminal lens subgroup.

6. The zoom lens with an image stabilizing function of claim 5, wherein the following conditions are satisfied:

$0.15 < |f2|/f1 < 0.45$ $0.8 < f3/f1 < 1.7$ where f3 is a focal length of the third lens group, f2 is a focal length of the second lens group, and f1 is a focal length of the first lens group.

7. A zoom lens with an image stabilizing function of claim 2, wherein the following conditions are satisfied:

$0 < D/fL < 10.0$ $40 < \nu-$ where, fL is a focal length of the terminal lens group, D is a distance along the optical axis of the zoom lens from a surface closest to the image side of the second terminal lens subgroup to a predetermined point on the object side of the second terminal lens subgroup, and ν− is an Abbe number of a negative lens component closest to the object side within the second terminal lens subgroup.

8. The zoom lens with an image stabilizing function of claim 7, wherein the following conditions are satisfied:

$0.15 < |f2|/f1 < 0.45$ $0.8 < f3/f1 < 1.7$ where f3 is a focal length of the third lens group, f2 is a focal length of the second lens group, and f1 is a focal length of the first lens group.

9. A zoom lens with an image stabilizing function of claim 2, wherein a shape factor q+ of a positive lens component closest to the object side within the second terminal lens subgroup satisfies a condition:

$-5.5 < q+ < 8.0.$

10. The zoom lens with an image stabilizing function of claim 9, wherein the following conditions are satisfied:

$0.15 < |f2|/f1 < 0.45$ $0.8 < f3/f1 < 1.7$ where f3 is a focal length of the third lens group, f2 is a focal length of the second lens group, and f1 is a focal length of the first lens group.

11. The zoom lens with an image stabilizing function of claim 2, wherein the following conditions are satisfied:

$0.15 < /|f2|/f1 < 0.45$ $0.8 < f3/f1 < 1.7$ where, f3 is a focal length of the third lens group, f2 is a focal length of the second lens group, and f1 is a focal length of the first lens group.

12. The zoom lens with an image stabilizing function of claim 11, further comprising a fixed flare diaphragm on the optical axis of the zoom lens for shielding unnecessary light rays when the second terminal lens subgroup moves relative to the optical axis of the zoom lens to stabilize the image.

13. The zoom lens with an image stabilizing function of claim 2, further comprising a fixed flare diaphragm on the optical axis of the zoom lens for shielding unnecessary light rays when the second terminal lens subgroup moves relative to the optical axis of the zoom lens to stabilize the image.

14. The zoom lens with an image stabilizing function of claim 1, wherein the following conditions are satisfied:

$0.2 < |fL2|/fL < 8$ $0.2 < |fL2|/fL1 < 20$ where, fL1 is a focal length of the first terminal lens subgroup, fL2 is a focal length of the second terminal lens subgroup, and fL is a focal length of the terminal lens group.

15. A zoom lens with an image stabilizing function of claim 14, wherein the following conditions are satisfied:

$\Delta W < 0.2$ $-3.0 < RL/|fL2| < 0$ $L/fL < 0.3$ where, fL2 is the focal length of the second terminal lens group, fL is the focal length of the terminal lens subgroup, ΔW is a size of a largest rotation angle (rad) of the second terminal lens subgroup during image stabilizing, RL is a curvature radius of surfaces closest to the image side of the second terminal lens subgroup, and L is an on-axis thickness of the second terminal lens subgroup.

16. A zoom lens with an image stabilizing function of claim 14, wherein the following conditions are satisfied:

$0 < D/fL < 10.0$ $40 < \nu-$ where, fL is the focal length of the terminal lens group, D is a distance along the optical axis of the zoom lens from a surface closest to the image side of the second terminal lens subgroup to a predetermined point on the object side of the second terminal lens subgroup, and ν− is an Abbe number of a negative lens component closest to the object side within the second terminal lens subgroup.

17. A zoom lens with an image stabilizing function of claim 14, wherein a shape factor q+ of a positive lens component closest to the object side within the second terminal lens subgroup satisfies a condition:

$-5.5 < q+ < 8.0.$

18. The zoom lens with an image stabilizing function of claim 4, further comprising a fixed flare diaphragm on the optical axis of the zoom lens for shielding unnecessary light rays when the second terminal lens subgroup moves relative to the optical axis of the zoom lens to stabilize the image.

19. A zoom lens with an image stabilizing function of claim 1, wherein the following conditions are satisfied:

$\Delta W < 0.2$ $-3.0 < RL/|fL2| < 0$ $L/fL < 0.3$ where, fL2 is a focal length of the second terminal lens group, fL is a focal length of the terminal lens subgroup, ΔW is a size of a largest rotation angle (rad) of the second terminal lens subgroup during image stabilizing, RL is a curvature radius of surfaces closest to the image side of the second terminal lens subgroup, and L is an on-axis thickness of the second terminal lens subgroup.

20. A zoom lens with an image stabilizing function of claim 19, wherein the following conditions are satisfied:

$$0<D/fL<10.0$$

$$40<v-$$

where, fL is the focal length of the terminal lens group, D is a distance along the optical axis of the zoom lens from a surface closest to the image side of the second terminal lens subgroup to a predetermined point on the object side of the second terminal lens subgroup, and v- is an Abbe number of a negative lens component closest to the object side within the second terminal lens subgroup.

21. A zoom lens with an image stabilizing function of claim 19, wherein a shape factor q+ of a positive lens component closest to the object side within the second terminal lens subgroup satisfies a condition:

$$-5.5<q+<8.0.$$

22. The zoom lens with an image stabilizing function of claim 19, further comprising a fixed flare diaphragm on the optical axis of the zoom lens for shielding unnecessary light rays when the second terminal lens subgroup moves relative to the optical axis of the zoom lens to stabilize the image.

23. A zoom lens with an image stabilizing function of claim 1, wherein the following conditions are satisfied:

$$0<D/fL<10.0$$

$$40<v-$$

where, fL is a focal length of the terminal lens group, D is a distance along the optical axis of the zoom lens from a surface closest to the image side of the second terminal lens subgroup to a predetermined point on the object side of the second terminal lens subgroup, and v- is an Abbe number of a negative lens component closest to the object side within the second terminal lens subgroup.

24. A zoom lens with an image stabilizing function of claim 23, wherein a shape factor q+ of a positive lens component closest to the object side within the second terminal lens subgroup satisfies a condition:

$$-5.5<q+<8.0.$$

25. The zoom lens with an image stabilizing function of claim 23, further comprising a fixed flare diaphragm on the optical axis of the zoom lens for shielding unnecessary light rays when the second terminal lens subgroup moves relative to the optical axis of the zoom lens to stabilize the image.

26. A zoom lens with an image stabilizing function of claim 1, wherein a shape factor q+ of a positive lens component closest to the object side within the second terminal lens subgroup satisfies a condition:

$$-5.5<q+<8.0.$$

27. The zoom lens with an image stabilizing function of claim 26, further comprising a fixed flare diaphragm on the optical axis of the zoom lens for shielding unnecessary light rays when the second terminal lens subgroup moves relative to the optical axis of the zoom lens to stabilize the image.

28. The zoom lens with an image stabilizing function of claim 1, further comprising a fixed flare diaphragm on the optical axis of the zoom lens for shielding unnecessary light rays when the second terminal lens subgroup moves relative to the optical axis of the zoom lens to stabilize the image.

29. A zoom lens with an image stabilizing function, comprising, in order from an object side to an image side:

a first lens group having positive refractive power;

a second lens group having negative refractive power;

a terminal lens group having positive refractive power arranged closest to the image side, the terminal lens group including at least, in order from the object side to the image side, a first terminal lens subgroup having positive refractive power and a second terminal lens subgroup having negative refractive power;

a third lens group having positive refractive power arranged between the second lens group and the terminal lens group; and a displacement device coupled to the second terminal lens subgroup and effecting image stabilizing by rotating the second terminal lens subgroup around a predetermined point on an optical axis of the zoom lens, wherein during zooming from a maximum wide-angle state to a maximum telephoto state, a distance between the first lens group and the second lens group increases, and a distance between the second lens group and the terminal lens group decreases, and wherein the following conditions are satisfied:

$$0.2<|fL2|/fL<8$$

$$0.2<|fL2|/fL1<20$$

where, fL1 is a focal length of the first terminal lens subgroup, fL2 is a focal length of the second terminal lens subgroup, and fL is a focal length of the terminal lens group.

* * * * *